Dec. 31, 1957  C. L. SHOBE  2,817,984
PIPE JOINT TOOL
Filed Jan. 23, 1956
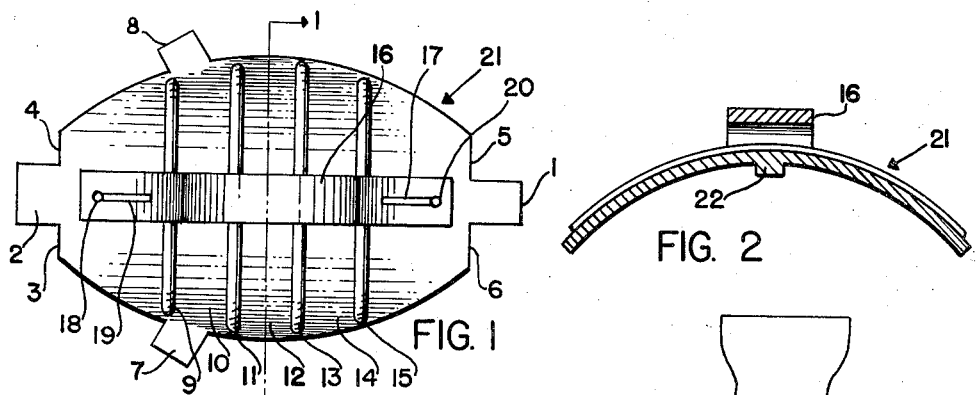
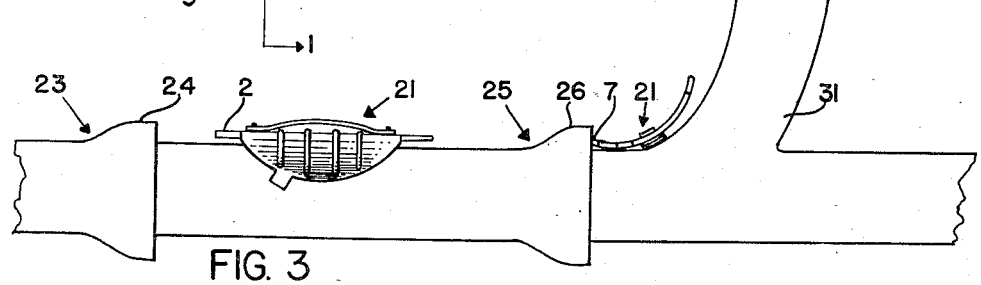
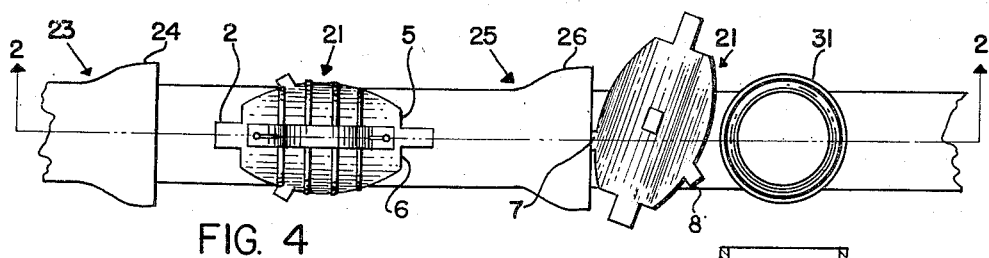
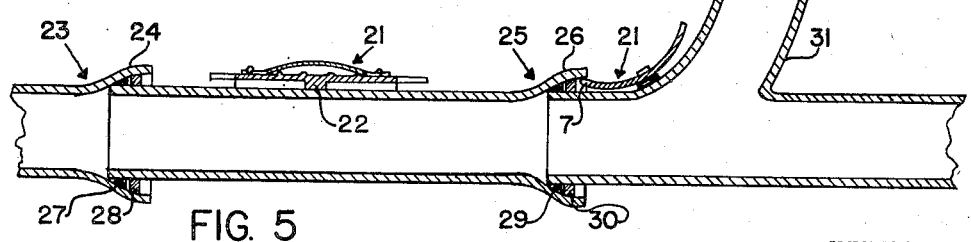
INVENTOR.
CHESTER L. SHOBE
BY R. W. Hodgson

United States Patent Office 2,817,984
Patented Dec. 31, 1957

2,817,984

PIPE JOINT TOOL

Chester L. Shobe, Great Bend, Kans.

Application January 23, 1956, Serial No. 560,538

2 Claims. (Cl. 78—47)

In certain types of pipe and the joining of such pipes, particularly cast iron soil pipes such as is used for sewers, and similar types of pipe, the joint is made in a bell housing which is an integral part of each length of pipe. The joining of lengths of pipe in this manner consists of slipping the end of pipe being joined into the bell of the other length of pipe and then packing into the joint a calking material (usually a material known as oakum) and thereafter sealing around the balance of the joint with lead.

In the actual operation of such a joint it is customary to slip the straight end of a length of pipe into the bell end of the joining length of pipe and to then pack a cord of oakum into the opening between the two pipes and within the bell section. In pushing or packing the oakum into this opening a tool is used which is known in the trade as a yarning tool and which consists of a long iron tool somewhat like a chisel which can be held by hand and either pushed against the oakum to pack it tightly into the bell joint or, if necessary, it can be struck with a hammer. A number of different size and shape yarning tools are used in the trade to accomplish this purpose.

After the oakum is in place a clamp, referred to as a joint runner, is placed around the pipe joint and clamped in position with an opening through which, and into which molten lead is poured. The lead flows about the pipe within the bell joint and forms a ring of lead about the pipe joint. The joint runner is then removed and any excessive neck of lead left where it was poured is removed. Thereafter the lead ring is forced tightly against the oakum which has previously been placed within the bell with calking irons which are somewhat like chisels and formed in a variety of different shapes. The calking iron is placed against the lead ring and hammered to force the lead tightly into the joint and gradually moved around the entire joint thus forcing a tight calking about the entire pipe joint within the bell housing.

In the past it has been necessary to have a large number of calking irons and yarning tools for use in corners and in close positions and other positions. These irons are of such a wide variety of size and shape that it is necessary for one to have a large number to properly calk a pipe joint. In addition to this there is frequently the problem of holding the various tools in order that a satisfactory job of calking may be accomplished in hard to reach places.

I have devised a tool which combines a number of desired features in calking tools within one tool and eliminates the need of having a large number of different tools and in addition provides a tool which can be readily fitted and used in tight and awkward positions. My tool consists of a cylindrical section of iron or other material especially shaped so that various portions thereof cooperate with one another and with the pipe joints, oakum and lead being placed therein and with a hammer or other tool being used.

My particular tool provides on one end a yarning tool which will handle virtually all operations required in placing the oakum in position and on the other end a calking tool which performs the functions assigned to most of the standard calking tools. In addition my tool incorporates in combination with its circular cross section side projections which are used as yarning tool and calking tool in tight and cumbersome places.

My tool further combines, in cooperation with its circular cross section, a series of hand or finger holds and a handle for easy handling of the tool. Further than this, by its weight and shape it provides means of striking blows against the calking material without the necessity of a hammer where it is difficult to strike with a hammer.

In a preferred form I have also provided a pivot position so that the calking or yarning tool end, or sections, of my invention may be used by cooperation between the tool and the pipe in a rocking action to achieve any angle of striking which may be desired.

My invention makes it possible to perform a more thorough job of calking with a smaller expenditure of time and effort on the part of the workmen. Particularly is this true in cases where the workmen are faced with the necessity of working under, or on the sides of, pipes where there is little room provided for manipulating tools and using a hammer. By its nature and its cooperation with the pipe as will be more readily understood by reference to the drawings, this tool can solve all of the yarning and calking problems ordinarily encountered which cannot be successfully and adequately solved except by a large number of the existing tools.

In order to more fully understand my invention reference is made to the attached drawings of which—

Figure 1 is a plan view of my tool;

Figure 2 is a cross section through the plane 1—1 of Figure 1;

Figure 3 is an elevation of a series of lengths of pipe and a ninety degree pipe joint showing my tool in position on both the ninety degree joint bell connection and the standard connection;

Figure 4 is a plan view of the same situation shown in Figure 3;

Figure 5 is a section through the plane 2—2 of Figure 4.

Referring to Figures 1 and 2 in more detail and by reference to the characters placed thereon the tool 21 is shown in its entirety and upon which 1 is the yarning tool appendage upon one end thereof and upon the opposed end thereof is the calking tool appendage 2. 3, 4, 5, and 6 are square or flat edges adjoining the yarning and calking tool appendages which edges can be used for striking with a hammer as desired to cause force to be exerted against the calking materials when in use. 7 and 8 are the yarning and calking tool appendages placed upon the edges of my tool and which are used in particularly tight and curved areas such as will be illustrated further in Figures 3, 4, and 5. 9, 10, 11, 12, 13, 14, and 15 indicate the ridges and valleys or the depressions and elevation points used in my tool for finger holds. The areas marked 10, 12, and 14 are areas which have been hollowed, or scooped, out of the metal so that fingers will fit therein and grip the tool better. It is quite obvious that the finger hold or finger grip portions as shown are not necessities to the successful operation of my tool but are a refinement which are deemed advisable and desirable for easier working. 16 is the handle which is formed of leather, plastic or other suitable materials suitable for strap, 17 and 19 are slots in the handle to allow the handle to be pressed flat against the tool or raised upward to slip the fingers under and also for joining the strap upon the buttons 18 and 20 which hold it to the tool. 22 is a small appendage on the under side of the tool used as a pivot or position to rock the tool back and forth in order to allow the yarning and calking appendages to be driven at the desired angle into the material being calked.

Referring in more detail to Figures 3, 4, and 5 which indicates a series of pipe joints including a right angle pipe section the tool 21 is shown in two different positions of use upon said pipe joints. It may be noted at this point that all of the various projections and features of the tool as indicated in detail in Figure 1 and Figure 2 are not shown in Figures 3, 4, and 5 but only those particular portions thereof are numbered which portions are considered necessary for the description of use as indicated in these figures. In all Figures 3, 4, and 5 the various numbers used indicate in each case the same identical item. As is shown in these views and with particular reference to Figure 5 a pipe joint 23 having a bell housing 24 is joined to a pipe joint 25 by having the end of said pipe joint 25 extend into the bell housing 24. A ring of oakum or similar material 27 is within the joint and a lead ring 28 is also shown in position against the ring 27. The calking tool 21 rests upon the pipe with the pivot appendage 22 providing the means for rocking the calking tool to achieve the desired angle and position of contact of the calking appendage with the oakum or lead ring. The calking appendage 2 is pushed against the lead ring 28 as desired and with as much force as necessary to strike the lead ring 28 and cause a proper action as necessary. The shoulder 5 or 6 is struck lightly with a hammer to further provide a secure calking of the lead ring. With further reference to Figure 5, 31 is an elbow joint of pipe in which a straight end has been placed within the bell 26 on the pipe length, 25. The oakum ring 29 and the lead ring 30 are shown in position within the bell ring. The calking tool 21 has been reversed within the curvature of the elbow joint so that it fits and can be used to drive the calking material into position with the side calking appendage 7.

It will be obvious to anyone skilled in the art that the exact shape and configurations, proportions and placing of appendages upon my calking tool may be varied within considerable limits without affecting the utility of my invention nor without deviating from the teaching and scope of my invention.

It is further obvious that a number of other changes will occur to those skilled in the art such as alternate methods of attaching the handle, alternate materials for use in constructing the tool and handle, alternate shape for the various tools and a number of other possible deviations.

The exact form of my invention shown herein is for exemplary purposes and is not to be construed as limiting the scope of my invention. My invention is to be construed in the light of the prior art with due consideration for the doctrine of equivalents.

I claim:

1. A pipe joint yarning and calking tool, comprising: body means having longitudinally spaced first and second ends, said body means being arcuately curved in a direction substantially transverse to and on each side of an imaginary longitudinal center line of said body means extending from said first end thereof to said second end thereof so as to define a portion of a cylinder in a direction transverse to said imaginary longitudinal axis having a longitudinally straight and laterally cylindrically convex upper surface and a similar longitudinally straight and laterally cylindrically concave lower surface cooperable for direct exterior engagement with a portion of a corresponding longitudinally straight and laterally cylindrically convex exterior surface of a pipe, with said imaginary longitudinal axis of said body means and with said longitudinally spaced first and second ends parallel to an imaginary longitudinal axis of said engaged pipe; a forwardly projecting calking tip carried by said first end of said body means in substantial alignment with said imaginary longitudinal center line thereof; and an impact-receiving anvil carried by said second end of said body means in substantial alignment with said imaginary longitudinal center line thereof and in longitudinally spaced substantial longitudinal alignment with said calking tip at the opposite end of said body means and in force transmitting relationship with respect thereto; the laterally upper convex surface of said longitudinal body means carrying thereon handle means and finger grip means positioned immediately thereabove.

2. A pipe joint yarning and calking tool, comprising: body means having longitudinally spaced first and second ends, said body means being arcuately curved in a direction substantially transverse to and on each side of an imaginary longitudinal center line of said body means extending from said first end thereof to said second end thereof so as to define a portion of a cylinder in a direction transverse to said imaginary longitudinal axis having a longitudinally straight and laterally cylindrically convex upper surface and a similar longitudinally straight and laterally cylindrically concave lower surface cooperable for direct exterior engagement with a portion of a corresponding longitudinally straight and laterally cylindrically convex exterior surface of a pipe, with said imaginary longitudinal axis of said body means and with said longitudinally spaced first and second ends parallel to an imaginary longitudinal axis of said engaged pipe; a forwardly projecting calking tip carried by said first end of said body means in substantial alignment with said imaginary longitudinal center line thereof; and an impact-receiving anvil carried by said second end of said body means in substantial alignment with said imaginary longitudinal center line thereof and in longitudinally spaced substantial longitudinal alignment with said calking tip at the opposite end of said body means and in force transmitting relationship with respect thereto; the laterally upper convex surface of said longitudinal body means carrying thereon handle means and finger grip means positioned immediately thereabove; the laterally concave lower surface of said longitudinal body means being centrally provided with downwardly projecting fulcrum means cooperable for abutting contact with respect to the surface of a pipe to provide longitudinal pivoting of said body means about the contact point of said fulcrum and said pipe to longitudinally vary the angular relationship of said body means and said engaged pipe.

References Cited in the file of this patent

UNITED STATES PATENTS

| 796,594 | Mueller | Aug. 8, 1905 |
| 1,714,337 | Yeager | May 21, 1929 |

FOREIGN PATENTS

| 418,547 | France | July 21, 1910 |